Patented Jan. 16, 1923.

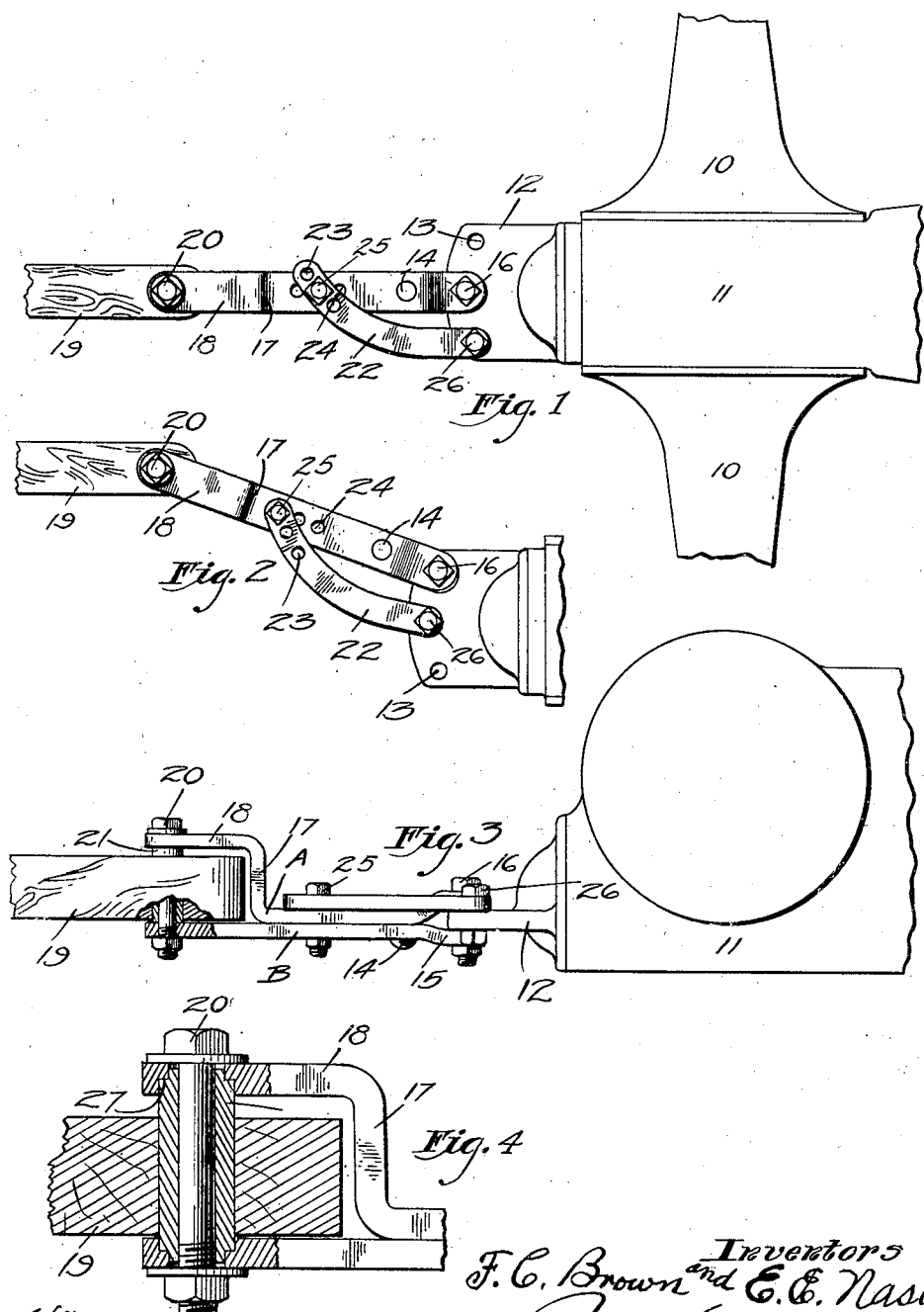

1,442,247

UNITED STATES PATENT OFFICE.

FRANK C. BROWN AND EMERY E. NASON, OF STATE CENTER, IOWA.

TRACTOR HITCH.

Application filed March 10, 1922. Serial No. 542,539.

*To all whom it may concern:*

Be it known that we, FRANK C. BROWN and EMERY E. NASON, citizens of the United States, and residents of State Center, in the county of Marshall and State of Iowa, have invented a certain new and useful Tractor Hitch, of which the following is a specification.

The object of our invention is to provide a tractor hitch of simple, durable and comparatively inexpensive construction.

More particularly it is our object to provide a hitch whereby the connection to the tongue of a vehicle or some implement will be so positioned that it will not strike the wheels of the tractor when turning.

Still another object is to provide a hitch wherein the parts may be swung to position and locked in that position where the line of draft will be in a line other than in a line drawn through the longitudinal center of the machine.

With these and other objects in view, our invention consists in the construction, arrangement and combination of the various parts of our device, whereby the objects contemplated are attained, as hereinafter more fully set forth, pointed out in our claim, and illustrated in the accompanying drawings, in which:

Figure 1 is a plan elevation of our invention attached to the draw bar of a tractor.

Figure 2 is a similar view, the parts being shown in another position.

Figure 3 is a side elevation of our hitch; and

Figure 4 is a detailed sectional view of a slightly modified form of our invention.

In the accompanying drawings, we have used the reference numeral 10 to indicate generally the axle housing of a tractor. The differential housing 11 is received between the axle housing 10.

A draw bar 12 is secured to the differential housing 11 in any suitable manner. The draw bar 12 is provided with a series of openings 13. The parts just described are of the ordinary construction.

Our invention consists of a pair of plates A and B. The plate A rests upon the plate B and is secured thereto by means of the rivet 14. The forward ends of the members A and B are slightly curved and spaced apart for forming the jaws 15.

The jaws 15 are designed to receive therebetween the draw bar 12. Each of the jaws 15 are provided with a registering opening through which is extended a bolt 16. The openings in the jaws 15 may be selectively positioned so as to register with any of the openings 13 in the draw bar 12.

From the construction of the parts just described it will be seen that the members A and B are so connected to the draw bar as to permit swinging movement. The member A has its rear end provided with an upturned portion 17 and a portion 18 substantially parallel with the member B.

It will be seen that the rear ends of the members A and B are thus spaced apart for forming a pair of jaws. A stub tongue 19 or an ordinary tongue of a vehicle or implement may be secured to the hitch in the following described manner:

The members A and B are provided with openings near their rear end through which is extended a bolt 20. A spacing sleeve 21 is received between the upper surface of the member B and the under surface of the portion 18 of the member A. The stub tongue is provided with an opening in which is received the sleeve 21.

In order to prevent swinging movement of the members A and B, we provide an arm 22 which may be curved as shown in the drawings or may be an ordinary straight bar.

The arm 22 is provided with an opening near one of its ends and with a plurality of openings 23 near its other end. The members A and B are provided with openings 24. Any of the openings 24 may be made to register with any of the openings 23. A bolt 25 is used for connecting the members A and B to the arm 22.

A bolt 26 connects the forward end of the arm 22 to the draw bar 12. The arm 22 may be connected to any of the openings 13 in the draw bar 12.

In Figure 1 of the drawings we have shown the hitch extended rearwardly from the machine so that the line of draft would be in a line through the longitudinal center of the machine. The arm 22 prevents the members A and B from swinging and maintains the entire hitch in proper position.

In Figure 2 of the drawings we have shown the parts in another of their positions. The line of draft, when the parts are in the just mentioned position is off to one side. The adjustability in varying the position of the hitch is highly desirable. The line of draft may be varied somewhat from that shown in Figure 2 of the drawings by disconnecting the bolt 25 and connecting the parts together by extending the bolts 25 to some of the other openings 23 and 24.

In Figure 4 of the drawings we have shown the sleeve 21 extending into the opening in the members A and B. In this form the openings are provided with shoulders 27 which rest upon the shoulder formed on the sleeve 21. The amount of pull on the bolt in this form is practically eliminated. In order to place the sleeve 21 in position it is necessary to spring the members A and B slightly apart. The rivet 14 which connects the two members together being spaced near the forward end of the members will permit the springing of the parts.

It may be mentioned that our hitch may be made of any size and may be made of any length desired. The advantage of our hitch in addition to the advantages mentioned resides in the fact that the tongue of the implement is spaced sufficiently from the tractor that it will not engage the tractor wheels when the tractor is being turned.

Some changes may be made in the construction and arrangement of our mechanism, without departing from the real purpose and spirit of our invention, and it is our intention to cover by our claim, any modified forms of structure, or use of mechanical equivalents, which may be reasonably included within its scope.

We claim as our invention:

A tractor hitch adapted to be secured to the draw bar of a tractor, the draw bar having a plurality of openings therein, including a pair of members arranged one upon another and secured together, said pair of members each having one of their ends slightly bent and spaced apart for providing a jaw member, said jaw member being designed to receive the draw bar therebetween, said jaw member having openings therein adapted to register with an opening in the draw bar, one end of one of said pair of members being bent away from the other for forming a jaw member, said last jaw member being designed to receive a stub tongue or the like and having formed therein registering openings so that a bolt may be extended therethrough for connecting the hitch to the stub tongue or the like, a bolt extended through the pair of openings in said members and through one of the openings in the draw bar, the pair of members having openings arranged therein between its ends, an arm having one of its ends provided with an opening and its other end provided with openings, a bolt for connecting one end of said arm to the draw bar, the free end of said arm being designed to have one of its openings register with one of the openings in said pair of members, a bolt extended through the last registering openings whereby the pair of members will be held against swinging movement, the parts being so arranged that the pair of members may be swung to position and held there for changing the line of draft relative to the vehicle.

Des Moines, Iowa, February 3, 1922.

FRANK C. BROWN.
EMERY E. NASON.